US012739122B2

(12) United States Patent
Rabinovitch et al.

(10) Patent No.: US 12,739,122 B2
(45) Date of Patent: Sep. 15, 2026

(54) USER AUTHENTICATION FOR A RESOURCE USING CONTEXT BASED ENCRYPTION OF AUTHENTICATION TOKENS

(71) Applicant: CyberArk Software Ltd., Petach-Tikva (IL)

(72) Inventors: Amalia Rabinovitch, Petach-Tikva (IL); Jason Yokota, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 97 days.

(21) Appl. No.: 18/741,332

(22) Filed: Jun. 12, 2024

(65) Prior Publication Data

US 2025/0385792 A1 Dec. 18, 2025

(51) Int. Cl.
*H04L 9/32* (2006.01)

(52) U.S. Cl.
CPC .................................. *H04L 9/3213* (2013.01)

(58) Field of Classification Search
CPC ..................................................... H04L 9/3213
See application file for complete search history.

(56) References Cited

U.S. PATENT DOCUMENTS 8,656,472 B2 * 2/2014 McMurtry ............. G06F 21/40 713/185
2007/0245152 A1 * 10/2007 Pizano ................ H04L 63/0861 713/186
2008/0243996 A1 * 10/2008 Wu ......................... H04L 65/65 709/203
2012/0214444 A1 * 8/2012 McBride ................. H04L 63/08 455/411
2017/0351852 A1 * 12/2017 Bao ......................... H04W 4/02
2018/0255036 A1 * 9/2018 Fiedler .................. H04L 67/146
2022/0038282 A1 * 2/2022 Teramoto .............. H04L 9/0894
2023/0006993 A1 * 1/2023 Bilgin ................. H04L 63/0892
2023/0421558 A1 * 12/2023 Teotia ................. H04L 63/0884
2024/0163276 A1 * 5/2024 Chinta .................. G06F 21/335

FOREIGN PATENT DOCUMENTS

EP 1349339 A2 * 10/2003 ........... H04L 67/563

* cited by examiner

*Primary Examiner* — Abu S Sholeman
(74) *Attorney, Agent, or Firm* — FINNEGAN, HENDERSON, FARABOW, GARRETT & DUNNER, LLP

(57) ABSTRACT

Disclosed embodiments relate to systems and methods for enabling recurrent use of authentication tokens. Techniques include identifying a first request by a user to access a resource; receiving, from an identity provider service, a token for authentication of a user; encrypting the token based on a secret inputted by the user and first contextual data associated with at least one of: the user, the resource, or a source of the first request; identifying a second request to access the resource; receiving the secret input by the user; decrypting the encrypted token; and based on validating the decrypted token, determining whether the user is permitted to access the resource.

19 Claims, 5 Drawing Sheets

USER AUTHENTICATION FOR A RESOURCE USING CONTEXT BASED ENCRYPTION OF AUTHENTICATION TOKENS

BACKGROUND

Technical Field

The present disclosure relates generally to authenticating a user prior to allowing a user access to a resource through the use of authentication tokens.

Background Information

In modern computing environments, highly sensitive data is often transferred between network identities and various resources, such as web-based applications. Before allowing users or entities access to data or resources associated with web-based applications, it may be necessary to authenticate the user to avoid malicious actors gaining access to sensitive data.

However, some techniques require a user to go through multiple steps in order to proceed with an authentication process. For example, an authentication process may begin with a user attempting to access an application and initiate the authentication process. The user may then generate an authentication request and be redirected to an external identity provider. The external identity provider may require a user to enter credentials such as a user name and password, which the external identity provider may authenticate. If the authentication is successful, the external identity provider may generate a security token to indicate that the user is authenticated, and return the token to the application through a secure method. The application may then verify the authenticity of the token, and upon determining the token is valid, grant a user access to the application. This type of solution uses external identity providers to handle the authentication process. However, there are drawbacks to this approach. Redirecting users to an external service means additional steps for the user, which may impact the user experience and lead to workarounds that compromise security. In addition, users may be disrupted in the transition from the application and the external service, especially if authentication requires multiple redirections. These problems may persist and become frustrating if a user must access an application often. Further, this authentication method is only useful for web applications that use cookies. This solution does not work for non-web based applications. Some solutions for non-web based applications use authentication token, where the tokens are commonly stored in cleartext on the user machine, which poses a security risk.

Therefore, there is a need for solutions that allow a user to quickly and efficiently authenticate, while allowing a user to store authentication tokens securely on a computing device associated with the user. The user authentication token solutions described herein may be securely stored on a user machine using, for example, two dynamic elements—a personal security PIN that is only known to the user and a source IP address that is unique to a user's client machine. The PIN and the source IP address may not be stored anywhere else, thus increasing the security of the authentication process.

SUMMARY

The disclosed embodiments describe non-transitory computer readable media, systems, and methods for performing operations for enabling recurrent use of authentication tokens. As described herein, the authentication tokens in their original form may not be exposed in a clear text format. For example, in some embodiments, a non-transitory computer readable medium may include instructions that, when executed by at least one processor, cause the at least one processor to perform operations for enabling recurrent use of authentication tokens. The operations may comprise identifying, by a computing device, and during a first time, a first request by a user to access a resource; receiving from an identity provider service, a token for authentication of the user; encrypting the token based on a secret inputted by the user and first contextual data associated with at least one of: the user, the resource, or a source of the first request; identifying, by the computing device, and during a second time later than the first time, a second request by the user to access the resource; receiving the secret inputted by the user; decrypting the second token based on the user input and second contextual data associated with the second request, the second contextual data being associated with at least one of: the user, the resource, or a source of the second request; and based on validating the decrypted token with the identify provider service, determining whether the user is permitted to access the resource.

According to a disclosed embodiment, the second request may use a native remote protocol, and the computing device may be configured to cause a display of a user interface to the user.

According to a disclosed embodiment, receiving the token for authentication of the user may be based on authenticating the user by the identity provider service based on an authentication credential associated with the user in relation to the first request.

According to a disclosed embodiment, the first contextual data and the second contextual data may comprise at least one of an IP address, username, local time zone, operating system version, or a host name.

According to a disclosed embodiment, the operations may further comprise denying the user access to the resource.

According to a disclosed embodiment, denying the user access to the resource may be further based on at least one of: a failure of the decrypting of the encrypted token, a difference between the encrypted token and the decrypted token, a failure based on a mismatch between the first contextual data and the second contextual data, or a mismatch between the secret inputted by the user for the first request and the secret inputted by the user for the second request.

According to a disclosed embodiment, the operations may further comprise requesting the user to load the secret after the second request is received and identifying the second contextual data.

According to a disclosed embodiment, the resource may be on-premises.

According to a disclosed embodiment, the secret may be one of a personal identification number (PIN), password, or passphrase.

According to a disclosed embodiment, the operations may further comprise based on encrypting the token, enabling the downloading of the encrypted token to a storage location of the computing device.

According to a disclosed embodiment, the operations may further comprise, after encrypting the token, decommissioning the secret and the first contextual data, wherein the resource and the computing device does not persistently store the secret.

According to a disclosed embodiment, the token may be configured to expire after a predetermined time period.

According to a disclosed embodiment, the time interval from the first time to the second time may be less than the time period.

According to a disclosed embodiment, the operations may further comprise identifying, by the computing device and during a third time later than the second time, a third request by the user to access the resource and based on determining that the token has expired before the third time, sending, by the resource and to the identity provider service, a request to authenticate the user, and displaying, by the resource, an indication of the authentication to a user interface.

According to a disclosed embodiment, the operations may further comprise supplementing the token with information including at least one: an identification of the resource, a username of the user, or a digital signature.

According to a disclosed embodiment, the resource may be configured to not persistently store the secret, the first contextual data, and the second contextual data.

According to a disclosed embodiment, encrypting the token based on the secret inputted by the user and the first contextual data may comprise encrypting the token using the secret to produce an intermediate output, and encrypting the intermediate output using the first contextual data to produce the encrypted token.

According to a disclosed embodiment, the operations may further comprise associating the encrypted token with a mobile application, and requesting, via the mobile application, biometric authentication of the user when the encrypted token is used for authenticating the user.

According to a disclosed embodiment, the operations may further comprise adding the encrypted token to at least one of a file associated with the resource or a storage location associated with the resource; and activating the file or retrieving the encrypted token from the storage location to request access to the resource for the user.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor (s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques for authentication described herein overcome several technological problems relating to security, efficiency, and functionality in the fields of cybersecurity and secure access to data, code, or applications.

Reference will now be made in detail to the disclosed embodiments, examples of which are illustrated in the accompanying drawings.

Figure 1:
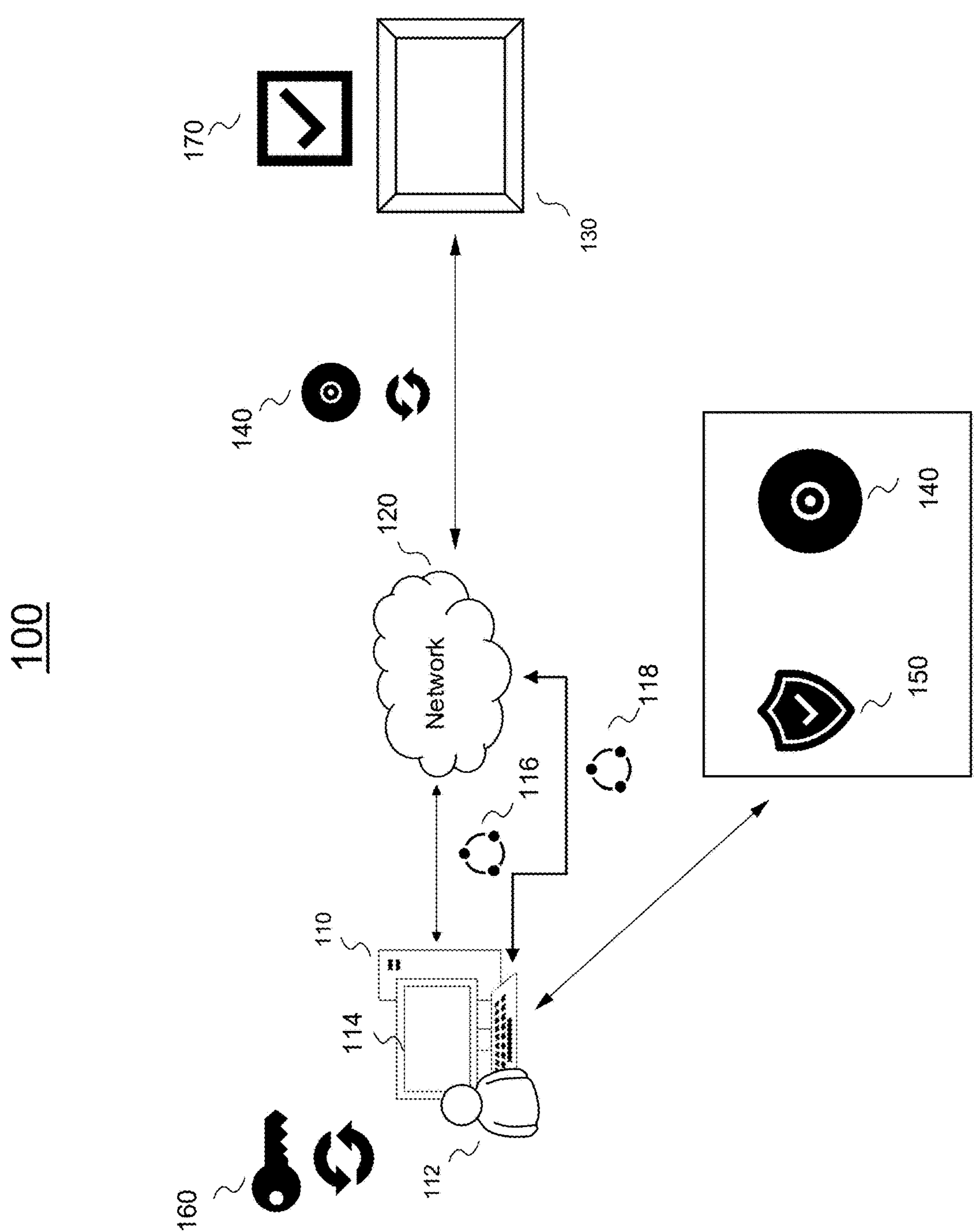
FIG. 1 illustrates an example system environment for authentication of a resource, consistent with disclosed embodiments.

FIG. 1 illustrates an example system environment 100 for authentication of a resource. The various components of system 100 may communicate over a network 120. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system environment 100 is shown as a network-based environment, it is understood that in some embodiments, one or more aspects of the disclosed systems and methods may also be used in a localized system, with one or more of the components communicating directly with each other.

System 100 may also include computing components 110. Computing components 110 may include or be part of a computing device and may include a user interface, such as user interface 114, computer data storage, a browser engine, a rendering engine, a secure web browser, a data persistence layer, and any other components necessary to run a web browser. In some embodiments, computer data storage may comprise computer components and recording media that are used to retain digital data. Data may be stored in memory, on servers, or in cloud computing environments. Computer data storage may be managed using a central processing unit of a computer. The browser engine may receive input from a user interface (e.g., interface 114) and process it to command a rendering engine. This browser engine may be used to provide an interactive user experience. For example, when a user clicks or selects an element on a user interface (e.g., interface 114), the browser engine may ensure that the browser redirects to the clickable element. In some embodiments, the browser engine is an intermediary between the user interface and a rendering engine. The rendering engine may be a component responsible for rendering web content, such as HTML, CSS, or JavaScript, etc., into a visual display on a user interface.

A secure web browser may include a dedicated web browser application, or a plug-in (also referred to as an "extension") to a non-dedicated web browser, having a built-in module performing the disclosed techniques (in some embodiments, in combination with an additional application or process ("agent") installed or operating in association with the network identity's machine). A data persistence layer may be part of the data storage. The data persistence layer may help a browser to store data locally, such as cookies, local cache, or the like.

System 100 may also include a user interface 114 with which a user 112 may interact. In some embodiments, user interface 114 enables a user 112 to input data to computing components 110. In some embodiments, information inputted to user interface 114 can be in various formats. For example, user interface 114 can include a keyboard, mouse, and a display such that user 112 can type information via a keyboard in a designated area on the display or draw information using the mouse. Activities of user 112 may include taking notes or entering information on user interface 114 in real-time. User interface 114 may also allow a user, such as user 112, to create a first request 116 to access a resource. First request 116 may be, for example, a Hypertext Transfer Protocol (HTTP) request formatted in HTTP protocol to initiate an action. In some embodiments, first request 116 may be a request for data. In some embodiments, first request 116 may be a request to access a resource, such as resource 130.

System 100 may also include a resource 130. Resource 130 may refer to anything that can be used to perform a computing task. Resource 130 may be any hardware or software accessible by a computer via a network, such as network 120, or any other object connected to a computer, such as computing components 110. Resource 130 may also refer to data storage, such as a database. Resource 130 may also refer to computer servers, storage servers, or management servers. A computer server may be a device or computer that manages network resources and provides services to other computers over a network. A storage server may be a device or software application that stores, manages, and secures data and applications across a network or through the Internet. A management server may refer to a central component of a system that may be used to handle hardware and software configurations, monitor a system, provide security updates to a system, provide backups to a system, manage users and access control, and perform server-side security measures. A management server may also be used to manage container orchestration, such as managing the deployment, scaling, integration, and lifecycles of containerized applications or software. In some embodiments, resource 130 may be a shared resource. A shared resource may be, for example, a printer or a network server that allows multiple users to access multiple computers to access the same resource.

System 100 may also include token 140. In some embodiments, token 140 may include an object that represents the right to perform an operation, including but not limited to security, access, and control. In some embodiments, the right to perform an operation may also identify an identity that is able to perform the operation. For example, an identity may be referenced according to a security policy or access-control policy to determine whether the identity can perform an operation. According to some embodiments, token 140 may include an exclusive or particular object that represents the right to perform an operation, including but not limited to security, access, and control. In some situations, the rights to perform operations may be based on an Active Directory™ framework, CyberArk Privileged Access Management™ framework, AWS Identity and Access Management™, or various other alternatives. Token 140 may be random or contain pseudo-random characters, biometric-based characters, or other unique data. Token 140 may also refer to authentication data, such as a password, cryptographic key, certificate, etc. For example, a cryptography random generator may include a process for creating cryptographically strong random values. This may be performed using, for example, a cryptographically secure pseudorandom number generator (CSPRNG) or cryptographic pseudorandom number generator (CPRNG). The values produced by the cryptography random generator should exhibit properties including, but not limited to, appearing random, being unpredictable in advance, and not being reliably reproduced after generation.

System 100 may also include identity service provider 150. Identity service provider 150 may be a server, personal computer, virtual instance, container instance, or other computing device or service. Identity service provider 150 may store and manage users' digital identities associated with one or more components of system 100. In some cases, identity service provider 150 may be a third-party identity management service (e.g., CyberArk Identity™, Microsoft's Active Directory Federation Services™, AWS AIM™, Azure AD™, Okta™, or others). Such services may manage credentials for access to data or resources, such as resource 130. Identity service provider 150 may verify and authenticate users based on, for example, an authentication token, username-password combination, or any other method of verifying and authenticating a user's identity. Identity service provider 150 may authenticate a user and provide an indication to resource 130 of the authentication, which may allow a user to access resource 130. Token 140 may be used to grant access to the user. Authentication may occur, for example, through the use of a privileged credential (e.g., password, SSH key, symmetric (e.g., public/private) key, or other type of cryptographic data or privileged access token). In some embodiments, identity service provider 150 may identify different levels of identities that may be recognized by resource 130. Each level may be associated with certain privileges. For example, there may be three levels of identities recognized by resource 130, each with its own unique set of privileges. When identity service provider 150 authenticates a user, it may indicate to resource 130 what type or level of identity the user is. Identity service provider 150 may be used to manage digital identities of users to determine whether or not someone has access to sensitive data or resources, such as resource 130. In some embodiments, records of user identities also must be securely stored to ensure that hackers and malicious actors cannot use these identities to impersonate a user.

System 100 may also include encrypting module 160. In some embodiments, encrypting module 160 may perform encryption of token 140. For example, token 140 may be encrypted in its entirety. In some embodiments, only sensitive data associated with token 140 may be encrypted. The encryption may be done symmetrically (e.g., using techniques such as AES, Blowfish, CAST5, RC4, DES, 3DES, etc.) or asymmetrically (e.g., using techniques such as Diffie-Hellman, DSS, RSA, YAK, etc.). In some embodiments, encrypting module 160 may comprise the use of an encryption key. An encryption key may include a piece of information, usually a string of numbers or letters that may, for example, be stored in a file, which, when processed through a cryptographic algorithm can encode or decode cryptographic data. In some embodiments, the encryption key is randomly generated by a cryptographically secure pseudorandom number generator (CSPRNG) or cryptographic pseudorandom number generator (CPRNG). In some embodiments, the encryption key may be a function of contextual metadata associated with a user or a request. In some embodiments, if the encryption key is generated as a function of contextual metadata associated with the user or the request, the encryption key may not be generated using a random number generator. In some embodiments, the encryption key may be a function of contextual metadata associated with the user or the request and a secret input by the user, consistent with disclosed embodiments.

System 100 may also include second request 118. User interface 114 may allow user 112 to create a second request 118 to access resource 130. In some embodiments, second request 118 occurs at a time later than first request 116. In some embodiments, after a user makes second request 118, token 140 may be decrypted. In some embodiments, system 100 may determine that user 112 has access to resource 130, as shown at permitted access 170. The user 112 being permitted access 170 may or may not receive a notification or prompt of the access. For example, permitted access 170 may include a success or confirmation prompt in a graphical user interface or the like. Alternatively, the user being permitted access 170 may simply be able to access an access-restricted network resource (e.g., application, database, server, data, etc.). In some embodiments, the determination that user 112 has access to resource 130 may be associated with either first request 116 or with second request 118. In other embodiments, the determination that user 112 has access to resource 130 may be associated with both first request 116 and with second request 118.

Figure 2:
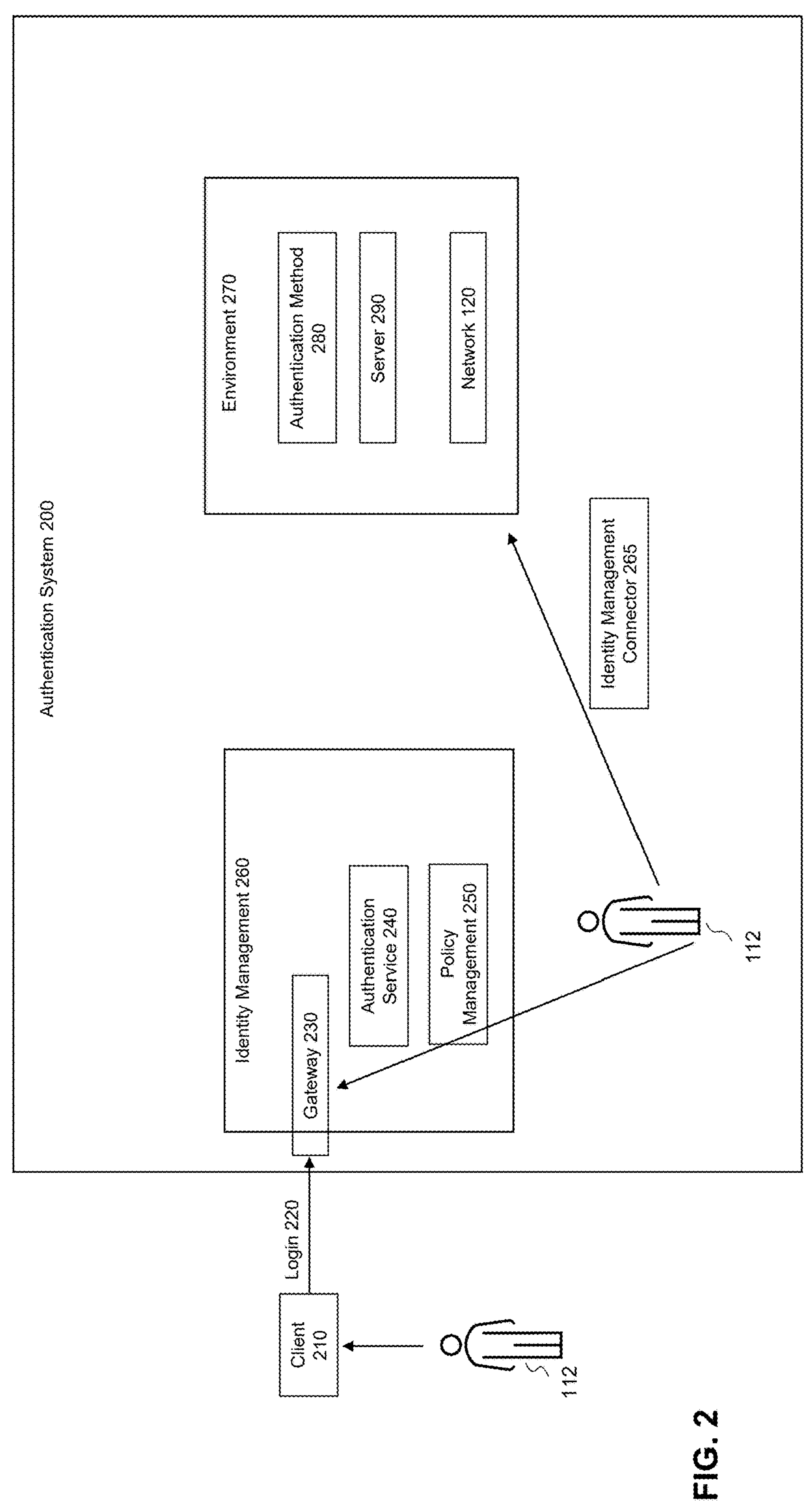
FIG. 2 is an example authentication system environment, consistent with disclosed embodiments.

FIG. 2 is an example authentication system environment, consistent with disclosed embodiments. As illustrated, authentication system 200 may comprise user 112, client 210, login 220, gateway 230, authentication service 240, policy management 250, identity management 260, identity management connector 265, environment 270, authentication method 280, on premises server 290, and network 120.

In some embodiments, user 112 may interact with client 210 through an interface, such as interface 114, as described with respect to FIG. 1. In some embodiments, client 210 may be hardware or software that is in communication with system 200 over a network, such as network 120. In some embodiments, client 210 may be a computer or a network of computers or computer software programs. In some embodiments, client 210 may send a request, as described in FIG. 1 based on user input.

In some embodiments, a request sent from client 210 may be sent to a gateway, such as gateway 230. In some embodiments, the request may be a request to login, such as login 220. It is to be understood that this is merely exemplary. In some embodiments, login 220 may require user 112 to log in with a credential to gain access to a computer system or program, such as client 210 by identifying and authenticating themselves to allow access to resource 130. In some embodiments, identity management 260 may comprise gateway 230, authentication service 240, and policy management 250. In some embodiments, identity management 260 may refer to a method of verifying the identities of entities and users on a network and determining the level of access to network resources that each entity and user has. In some embodiments, identity management 260 may be used to secure systems and networks and keep data secure. In some embodiments, identity management 260 ensures that only authenticated users are granted access to specific applications and components of a system. In some embodiments, identity management 260 may work in conjunction with an identity service provider, as described in FIG. 1, to track identity information across a network. In some embodiments, identity management 260 may provide a first line of defense against cyber threats by allowing users to only access the resources they need. In some embodiments, identity management 260 may manage attributes related to a user or other entities that may require access to resources. Identity management 260 may protect identities through digital technologies as described with respect to this application. In some embodiments, identity management 260 may not include, but may operate in conjunction with, gateway 230, authentication service 240, and policy management 250.

In some embodiments, gateway 230 may refer to a computing device on a network, such as network 120, that provides an interface between two applications or networks. In other embodiments, gateway 230 may serve as a proxy between two applications, including as a proxy to a resource, such as resource 130, as described with respect to FIG. 1. In some embodiments, gateway 230 may provide an interface between client 210 and identity management 260 over authentication system 200. In some embodiments, user 112 may also communicate with gateway 230, through, for example, interface 114.

In some embodiments, authentication service 240 may be used to secure authentication of the identity of users and entities on network 120. In some embodiments, authentication service 240 may be an identity verification mechanism. In some embodiments, the identify verification mechanism may confirm or deny that an identity is correct by comparing credentials associated with the identity with previously confirmed credentials. In some embodiments, authentication service 240 may use a token as described with respect to FIG. 1 to perform an authentication.

In some embodiments, identity management 260 may operate using policy management 250. Policy management 250 may refer to software that is used to assist policy owners with policies to identify, authenticate, and authorize users to have proper access to resources based on their identities.

In some embodiments, identity management connector 265 may be the connection between user 112 and environment 270. Environment 270 may comprise network 120, authentication method 280, and on premises server 290. Environment 270 may refer to a group of servers that are privately owned and control by the owner of a system, such as authentication system 200. Environment 270 may be on-premises, in the cloud, or a hybrid environment. On-premises environments may allow users to have full control of the environment infrastructure and maintain them based on their needs. A cloud environment may be stored and managed on a cloud provider server (e.g., AWS™, IBM Cloud™, Azure™, etc). Users may access a cloud environment through a web browser or interface. A hybrid on-premises and cloud environment may combine elements of both on-premises and cloud environments. In a hybrid setup, some applications or elements of the environment may be hosted in the cloud, while other applications or elements of the environment may be kept on-premises. Authentication method 280 may refer to the method of authentication used to access the resource. In some embodiments, authentication method 280 may refer to the use of a token, such as token

140 or any other required methods to access the resource. Server 290 may refer to a server that is part of environment 270 and may be any server as described with respect to FIGS. 3 and 4.

Figure 3:
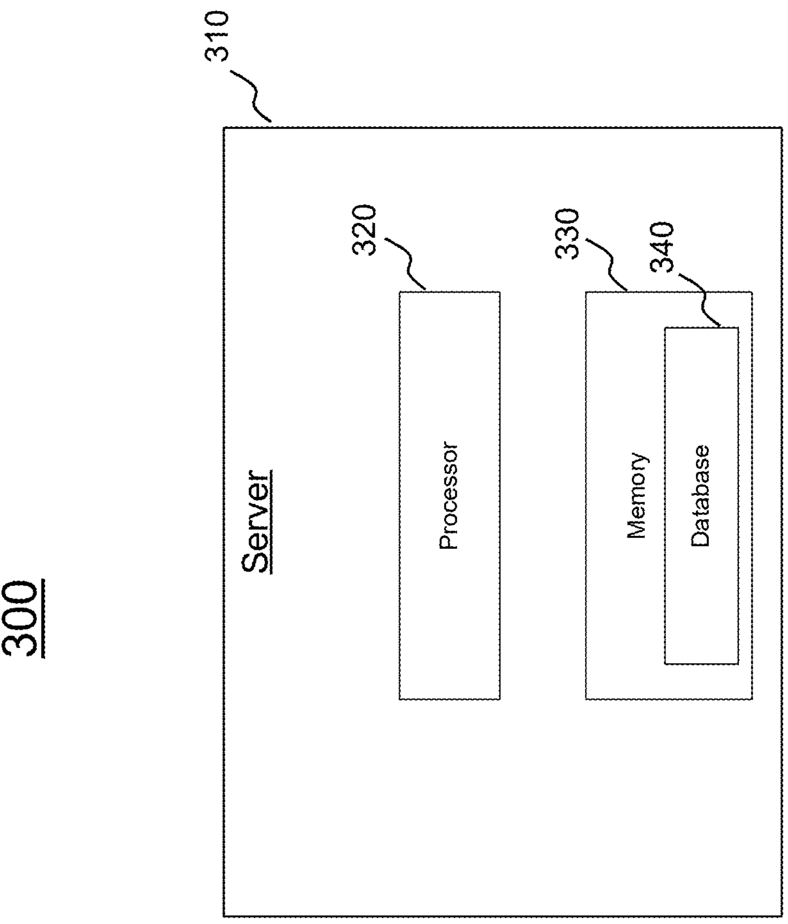
FIG. 3 illustrates a block diagram of an example server, consistent with disclosed embodiments.

FIG. 3 is a block diagram 300 showing an example server 310, consistent with the disclosed embodiments. Server 310 may be a computing device (e.g., a server, virtual machine, container instance, personal computer, mobile device, IoT device, etc.), and may include one or more associated processors 320 and/or memories 330. Consistent with disclosed embodiments, identity management 260, authentication service 240, policy management 250, environment 270, identity management connector 265, authentication method 280, and server 290 may be implemented in accordance with the elements of FIG. 3.

Processor 320 may take the form of, but is not limited to, a microprocessor, embedded processor, or the like, or may be integrated in a system on a chip (SoC). Furthermore, according to some embodiments, processor 320 may be from the family of processors manufactured by Intel®, AMD®, Qualcomm®, Apple®, NVIDIA®, or the like. The processor 320 may also be based on the ARM architecture, a mobile processor, or a graphics processing unit, etc. The disclosed embodiments are not limited to any type of processor configured in server 310.

Memory 330 may include one or more storage devices configured to store instructions used by processor 320 to perform functions related to server 310. The disclosed embodiments are not limited to particular software programs or devices configured to perform dedicated tasks. For example, memory 330 may store a single program, such as a user-level application, that performs the functions associated with the disclosed embodiments, or may comprise multiple software programs. Additionally, processor 320 may, in some embodiments, execute one or more programs (or portions thereof) remotely located from server 310. Furthermore, memory 330 may include one or more storage devices configured to store data for use by the programs. Memory 330 may include, but is not limited to a hard drive, a solid-state drive, a CD-ROM drive, a peripheral storage device (e.g., an external hard drive, a USB drive, etc.), a network drive, a cloud storage device, or any other storage device.

In some embodiments, memory 330 may include a database 340. Database 340 may be included on a volatile or non-volatile, magnetic, semiconductor, tape, optical, removable, non-removable, or other type of storage device or tangible or non-transitory computer-readable medium (e.g., memory 330). Database 340 may also be part of server 310 or separate from server 310. When database 340 is not part of server 310, server 310 may exchange data with database 340 via a communication link. Database 340 may include one or more memory devices that store data and instructions used to perform one or more features of the disclosed embodiments. Database 340 may include any suitable databases, ranging from small databases hosted on a workstation to large databases distributed among data centers. Database 340 may also include any combination of one or more databases controlled by memory controller devices (e.g., server(s), etc.) or software. For example, database 340 may include document management systems, Microsoft SQL™ databases, SharePoint™ databases, Oracle™ databases, Sybase™ databases, other relational databases, or non-relational databases, such as mongo and others.

Figure 4:
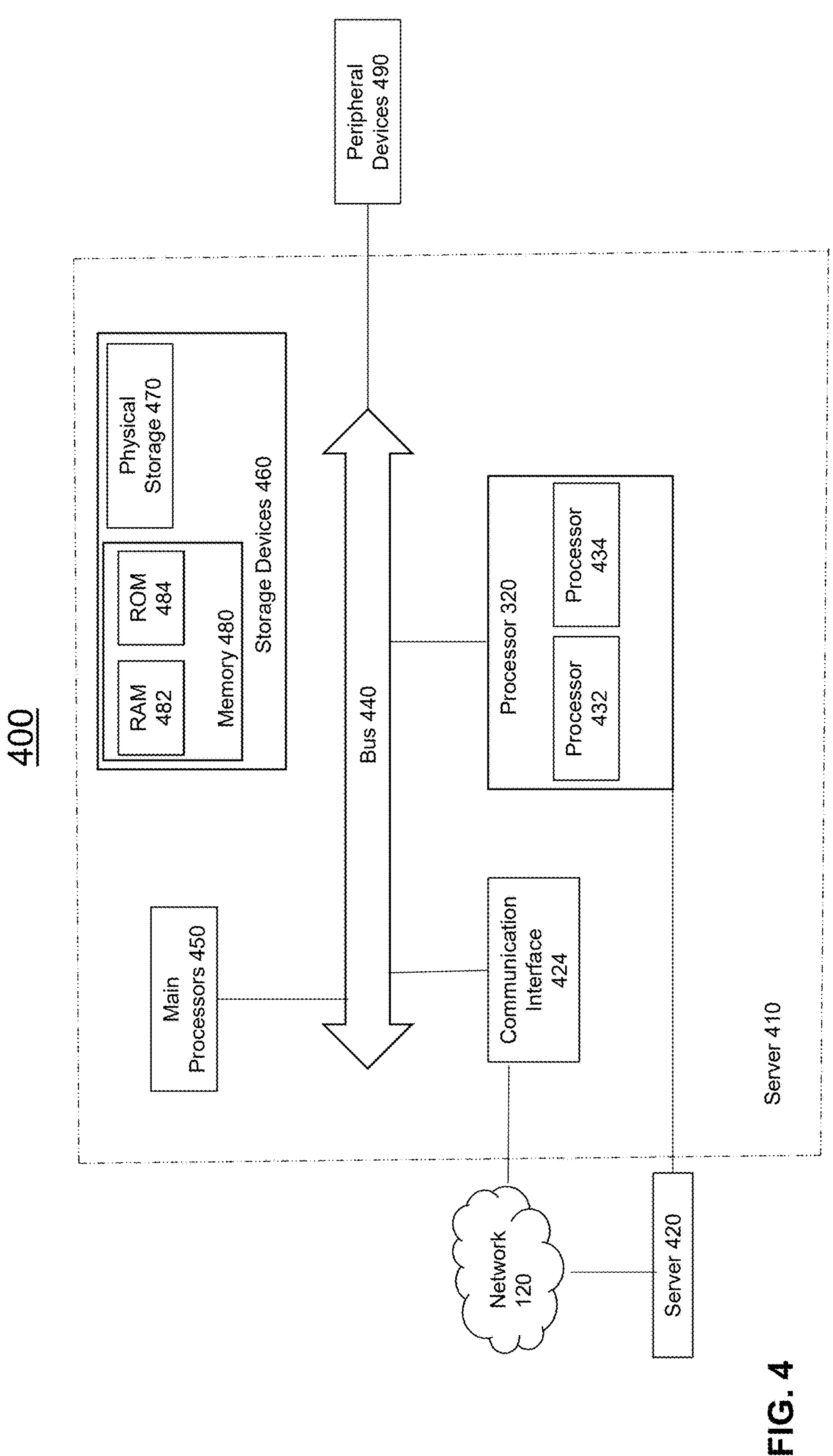
FIG. 4 is a schematic diagram of a distributed system for implementing the disclosed embodiments, consistent with disclosed embodiments.

FIG. 4 is a schematic diagram of an exemplary distributed system 400 for implementing embodiments of the present disclosure. According to FIG. 4, server 410 (e.g., similar to server 310) of distributed computing system 400 includes a bus 440 or other communication mechanisms for communicating information, one or more processors 320 communicatively coupled with bus 440 for processing information, and one or more main processors 450 communicatively coupled with bus 440 for processing information. Processors 320 can be, for example, one or more microprocessors. In some embodiments, one or more processors 320 includes processor 432 and processor 434, and processor 432 and processor 434 are connected via an inter-chip interconnect of an interconnect topology. In some embodiments, processor 434 can be a dedicated hardware accelerator (such as a neural network processing unit) for processor 432. Main processors 450 can be, for example, central processing units ("CPUs").

Server 410 may transmit data to or communicate with another server 420 through a network 120. Network 120 may be a local network, an internet service provider, Internet, or any combination thereof. Communication interface 424 of server 410 is connected to network 120, which may enable communication with server 420 (e.g., also similar to server 310). In addition, server 410 can be coupled via bus 440 to peripheral devices 490, which may include displays (e.g., cathode ray tube (CRT), liquid crystal display (LCD), touch screen, etc.) and input devices (e.g., keyboard, mouse, soft keypad, etc.).

Server 410 may be implemented using customized hard-wired logic, one or more ASICs or FPGAs, firmware, or program logic that in combination with the server functionality described herein causes server 410 to be a special-purpose machine.

Server 410 further includes one or more storage devices 460, which may include memory 480 and physical storage 470 (e.g., hard drive, solid-state drive, etc.). Memory 480 may include random access memory (RAM) 482 and read-only memory (ROM) 484. Storage devices 460 maybe communicatively coupled with processors 320 and main processors 450 via bus 440. Storage devices 460 may include a main memory, which can be used for storing temporary variables or other intermediate information during execution of instructions to be executed by processors 320 and main processors 450. Such instructions, e.g., those as discussed below in connection with FIG. 5, after being stored in non-transitory storage media accessible to processors 320 and main processors 450, render server 410 into a special-purpose machine that is customized to perform operations specified in the instructions. The term "non-transitory media" as used herein refers to any non-transitory media storing data or instructions that cause a machine to operate in a specific fashion (e.g., in accordance with FIG. 5, below). Such non-transitory media can include non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, flash memory, register, cache, any other memory chip or cartridge, and networked versions of the same.

Various forms of media can be involved in carrying one or more sequences of one or more instructions to processors 320 or main processors 450 for execution. For example, the instructions can initially be carried out on a magnetic disk or solid-state drive of a remote computer. The remote computer can load the instructions into its dynamic memory and send the instructions over a telephone line using a modem. A modem local to server 410 can receive the data and use an infra-red transmitter to convert the data to an infra-red signal. An infrared detector can receive the data carried in the infrared signal, and appropriate circuitry can place the data on bus 440. Bus 440 carries the data to the main memory within storage devices 460, from which processors 320 or main processors 450 retrieves and executes the instructions.

Authentication system 200 (as shown in FIG. 2) or one or more of its components may reside on either server 310 or 410 and may be executed by processors 320 or 450.

User interface 114 may communicate with server 310 or 410 through network 120. For example, server 310 or 410 may be a server configured to store files accessible through a network (e.g., a web server, application server, virtualized server, etc.). Server 310 or 410 may be implemented as a Software as a Service (Saas) platform through which software for auditing recorded user activity may be provided to an organization as a web-based service.

Figure 5:
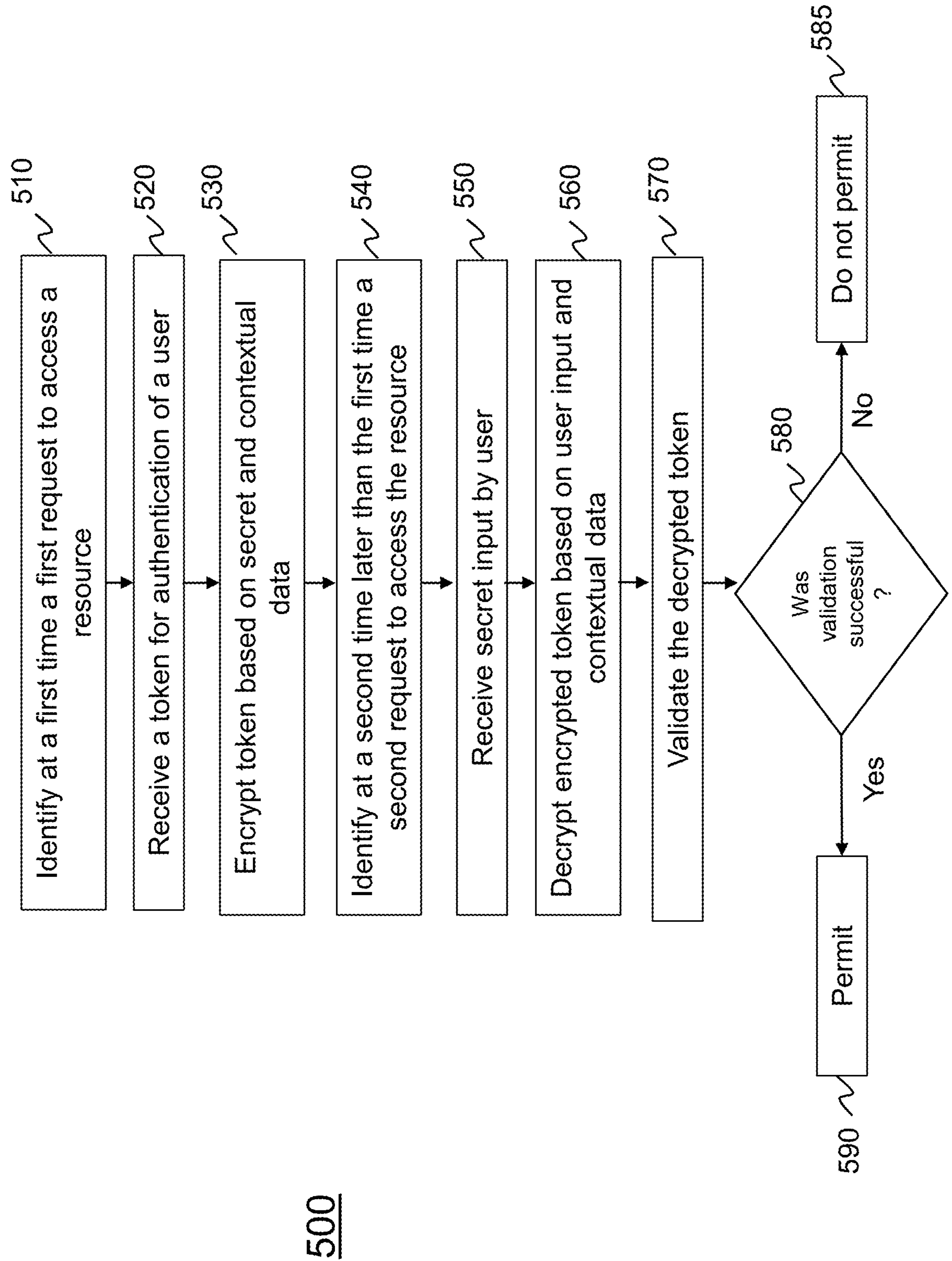
FIG. 5 is a flowchart showing an example process for authentication of a resource, consistent with disclosed embodiments.

FIG. 5 is a flowchart showing an example process for enabling recurrent use of authentication tokens, consistent with disclosed embodiments. Process 500 may be performed by at least one processing device of a server (e.g., server 310 or 410), via a processor such as processor 320, as described above. In some embodiments, a non-transitory computer readable medium may contain instructions that when executed by a processor cause the processor to perform process 500. Further, process 500 is not necessarily limited to the steps shown in FIG. 5 and any steps or processes of the various embodiments described throughout the present disclosure may also be included in process 500. In some embodiments, the authentication tokens described with respect to FIG. 5 may be in their original form and may not be in a clear text format.

In step 510, process 500 may include identifying by a computing device and during a first time, a first request by a user to access a resource. In some embodiments, the computing device may be any machine used to acquire, store, analyze, process, and publish data and other information electronically. In some embodiments, the computing device may be part of computer components as described with respect to FIG. 1 and the first request to access a resource may be a request and resource as described with respect to FIGS. 1 and 2. In some embodiments, the first request for the resource may come from a component other than the computing device, such as client 210, as described with respect to FIG. 2. For example, the first request may come from the initiation of an application, an automated trigger, a time of day, a request from another application, etc. In some embodiments, the resource may be on-premises. Alternatively, the resource may be based in the cloud (e.g., AWS™, IBM Cloud™, Azure™, Docker™, etc.).

In step 520, process 500 may include receiving, from an identity service provider, a token for authentication of the user. In some embodiments, the token may be received in its original form, which may be clear text (e.g., without encryption). The identity service provider may be as described with respect to FIG. 1. The token may be the token as described with respect to FIG. 1. In some embodiments, the token may be used to authenticate a user to allow the user to access a resource, as described with respect to FIG. 1. In some embodiments, the token may be used in addition to or in place of a password. In some embodiments, the token may be supplemented with information including at least one of identification of the resource (such as through an identifier of the resource, including a host name or an IP address), a username of the user, or a digital signature. In some embodiments, a digital signature may refer to a method for verifying the authenticity of a digital message or document. In some embodiments, receiving the token for authentication of the user may be based on or occur following authenticating the user by the identity service provider based on an authentication credential associated with the user in relation to the first request. In some embodiments, the authentication credential may be a certificate, password, or pin. In further embodiments, the authentication credential is known only to the user. In additional embodiments, the token may be configured to expire after a pre-determined time period. In some embodiments, the lifetime of a token may be determined by a policy managed by an identity service provider, as described with respect to FIG. 1. In some embodiments, a time interval from the first time to the second time is less than the pre-determined time period.

In step 530, process 500 may encrypt the token based on a secret inputted by the user and first contextual data associated with at least one of: the user, the resource, or a source of the first request. Examples of secrets may be passwords, credentials, tokens, keys, hashes, or other unique data selected by or otherwise known solely to the user, and used for authentication, authorization, personal identification number (PIN), biometric information associated with a user, or other secure access techniques. In some embodiments, a secret may be a textual combination of letters or numbers. In other embodiments, a secret may be an image. Contextual data may refer to any data that gives context to a user, the resource, or a source of the first request. In some embodiments, contextual data may refer to an IP address, username associated with the user, a group associated with a network identity, a role a user is associated with, an authentication type, a time zone associated with the user location, an operating system version of the computing device, a type of the computing device, a location of the computing device, or a host name of the computing device. In some embodiments, once the token is encrypted, the encrypted token may be downloaded to a storage location of the computing device. In some embodiments, a user may select a storage location. In some embodiments, the token may be downloaded for use in future authentication processes when a user requests access to a resource. In some embodiments, process 500 may further include adding the encrypted token to at least one of: a file associated with the resource, or a storage location associated with the resource. In some embodiments, process 500 may further include activating the file or retrieving the encrypted token from the storage location to request access to the resource for the user. In other embodiments, after encrypting the token, process 500 may further comprise decommissioning the secret and the first contextual data, wherein the resource and the computing device do not persistently store the secret. In some embodiments, the computing device may not persistently store the secret once the user has received a token or once the system has supplied a token. In some embodiments, encrypting the token may be based on the secret inputted by the user and the first contextual data. In some embodiments, the encrypting may include encrypting the token using the secret to produce an intermediate output and encrypting the intermediate output using the first contextual data to produce the encrypted token. In other embodiments, encrypting the token using the secret may not include producing an intermediate output used in encrypting the token. In some embodiments, the encrypted token may be associated with a mobile application. In some embodiments, the mobile application may request biometric (e.g., retina, fingerprint, voice, face, etc.) authentication of the user when the encrypted token is used for authenticating the user.

In step 540, process 500 may identify, by the computing device, and during a second time later than the first time, a second request by the user to access the resource. In some embodiments, the second request is a request to access the same resource as the first request. In some embodiments, the second request may be a request made by the same user as the first request. In some embodiments, the second request may be a request as described with respect to FIG. 2. In some embodiments, the second request may use a native remote protocol to request access to the resource. In some embodiments, a native remote protocol may be a protocol that enables a user to access and control a computer through a secure, reliable channel no matter where in the world the user is located. In some embodiments, the native remote protocol may allow a user to access data on another machine through a server over a network connection, as described with respect to FIG. 4. A native remote protocol eliminates the need for a user to be physically present at a location while presenting a secure environment to access resources. In some embodiments, the second request causes the computing device to display a user interface to the user. In some embodiments, process 500 may further include identifying by the computing device and during a third time later than the second time, a third request by the user to access the resource. In some embodiments, there may be a determination that the token has expired before the third time. Upon determining the token has expired before the third time, process 500 may further include sending, by the resource and to the identity provider service, a request to authenticate the user and display, by the resource, an indication of the authentication to a user interface.

In step 550, process 500 may receive the secret inputted by the user. For example, the secret may be extracted from the user's request or from a user's machine based on the request. Further, the secret may be manually input (e.g., typed or uploaded) by the user. In some embodiments, the secret may be manually input using the user interface displayed to the user. Other techniques of inputting the secret are possible as well. In some embodiments, the user may load the secret after the second request is received. In further embodiments, the secret input by the user may be dynamically defined. In other embodiments, the secret input by the user may be defined in real-time by the user. In some embodiments, the secret may not be predetermined by the user. In some embodiments, the secret may be different in each iteration of a user requesting access to a resource.

In step 560, process 500 may decrypt the encrypted token based on the user input received in step 550 and second contextual data associated with the second request, associated with at least one of the user, the resource, or a source of the second request. In some embodiments, process 500 may not proceed with step 560 if the second contextual data does not match the first contextual data. As discussed above, the decryption may be asymmetric or symmetric, depending on the encryption technique used. In some embodiments, the decryption may occur by using the user's source IP address. In some embodiments, the decryption may occur by using the user's source IP address and confirming the authentication credential. In further embodiments, the second contextual data may be identified. In some embodiments, the second contextual data may be identified in a similar manner as the identification of the first contextual data. In other embodiments, if the second contextual data differs from the first contextual data, the decrypted token may not be successfully validated with the identity provider. In some embodiments, if such a difference occurs, a user may be notified there was an error. In some embodiments, a user may be asked to re-authenticate and begin process 500 again from step 510. This increases the protection against potential malicious attackers attempting to impersonate the user. In order for the decrypted token to be successfully validated, the same user should be requesting access to the same resource from the same computing device. In some embodiments, if the second contextual data differs from the first contextual data, process 500 may not proceed to step 570 without successfully validating the token. In some embodiments, process 500 may deny the user access to the resource based on a mismatch between the first contextual data and the second contextual data. In some embodiments, only one item of data may be needed to differ to result in a mismatch. In some embodiments, process 500 may deny the user access to the resource based on a mismatch between the secret inputted by the user for the first request and the secret inputted by the user for the second request. In some embodiments, the secret inputted by the user for the first request and the secret inputted by the user for the second request must be the same for process 500 to proceed. In some embodiments, denying the user access to the resource may be based on a failure of the decrypting of the encrypted token. In other embodiments, denying the user access to the resource may be based on a difference between the encrypted token and the decrypted token. In some embodiments, the difference may be based on a mismatch between the first contextual data and the second contextual data or a mismatch between the secret inputted by the user for the first request and the secret inputted by the user for the second request In step 570, process 500 may determine whether to validate the decrypted token. In some embodiments, there may be policies or rules associated with the validation of the decrypted token.

Based on the validation at step 570, process 500 may determine whether the validation was successful at step 580. If the validation step 570 fails, process 500 may, at step 580, determine that the validation was not successful and may then proceed to step 585 and not permit the user access to the resource. If at step 590, process 500 permits access, process 500 may proceed to step 590 and permit the user to access the resource.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the “C” programming language or similar programming languages. The computer readable program instructions may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer-readable medium including instructions that, when executed by at least one processor, cause the at least one processor to perform operations for enabling recurrent use of authentication tokens, wherein the authentication tokens in their original form are not exposed in a clear text format, the operations comprising:

- identifying, during a first time, by a computing device associated with a software application, a first request by a user to access a resource, the first request including an authentication credential associated with the user;
- receiving, from an identity provider service, a token for authentication of the user;
- encrypting the token based on a secret inputted by the user and first contextual data associated with at least one of: the user, the resource, or a source of the first request, wherein encrypting the token based on the secret inputted by the user and the first contextual data comprises:
  - encrypting the token using the secret to produce an intermediate output; and
  - encrypting the intermediate output using the first contextual data to produce the encrypted token;
- identifying, by the computing device, and during a second time later than the first time, a second request by the user to access the resource;
- receiving the secret inputted by the user;
- decrypting the encrypted token based on the user input and second contextual data associated with the second request wherein:
  - the second contextual data is associated with at least one of: the user, the resource, or a source of the second request, and
  - the decrypting is failed based on a mismatch between the first contextual data and the second contextual data; and
- based on validating the decrypted token with the identity provider service, determining whether the user is permitted to access the resource.

2. The non-transitory computer-readable medium of claim 1, wherein the second request uses a native remote protocol, and the computing device is configured to cause a display of a user interface to the user.

3. The non-transitory computer-readable medium of claim 1, wherein the receiving the token for authentication of the user is based on authenticating the user by the identity provider service based on the authentication credential associated with the user in relation to the first request.

4. The non-transitory computer-readable medium of claim 1, wherein the first contextual data and the second contextual data comprise at least one of an IP address, username, local time zone, operating system version, or a host name.

5. The non-transitory computer-readable medium of claim 1, wherein the operations further include denying the user access to the resource.

6. The non-transitory computer-readable medium of claim 5, wherein denying the user access to the resource is based on a failure of the decrypting of the encrypted token, or a difference between the encrypted token and the decrypted token, or a mismatch between the secret inputted by the user for the first request and the secret inputted by the user for the second request.

7. The non-transitory computer-readable medium of claim 1, wherein the operations further comprise:

- requesting the user to load the secret after the second request is received; and
- identifying the second contextual data.

8. The non-transitory computer-readable medium of claim 1, wherein the resource is on-premises.

9. The non-transitory computer-readable medium of claim 1, wherein the secret comprises one of a personal identification number (PIN), password, or passphrase.

10. The non-transitory computer-readable medium of claim 1, wherein the operations further comprise:

- based on encrypting the token, enabling downloading of the encrypted token to a storage location of the computing device.

11. The non-transitory computer-readable medium of claim 1, wherein the operations further comprise:

- after encrypting the token, decommissioning the secret and the first contextual data, wherein the resource and the computing device does not persistently store the secret.

12. The non-transitory computer-readable medium of claim 1, wherein the token is configured to expire after a predetermined time period.

13. The non-transitory computer-readable medium of claim 12, wherein a time interval from the first time to the second time is less than the time period.

14. The non-transitory computer-readable medium of claim 12, wherein the operations further comprise:

- identifying, by the computing device and during a third time later than the second time, a third request by the user to access the resource; and
- based on determining that the token has expired before the third time:
- sending, by the resource and to the identity provider service, a request to authenticate the user; and
- displaying, by the resource, an indication of the authentication to a user interface.

15. The non-transitory computer-readable medium of claim 1, wherein the operations further comprise:

- supplementing the token with information including at least one of: an identification of the resource, a username of the user, or a digital signature.

16. The non-transitory computer-readable medium of claim 1, wherein the resource is configured to not persistently store the secret, the first contextual data, and the second contextual data.

17. The non-transitory computer-readable medium of claim 1, wherein the operations further comprise:

- associating the encrypted token with a mobile application; and
- requesting, via the mobile application, biometric authentication of the user when the encrypted token is used for authenticating the user.

18. The non-transitory computer-readable medium of claim 1, wherein the operations further comprise:

adding the encrypted token to at least one of: a file associated with the resource or a storage location associated with the resource; and activating the file or retrieving the encrypted token from the storage location to request access to the resource for the user.

19. A computer-implemented method for authentication using persistent tokens, wherein the authentication tokens in their original form are not exposed in a clear text format, the method comprising:

identifying, during a first time, by a computing device associated with a software application, a first request by a user to access a resource, the first request including an authentication credential associated with the user;

receiving, from an identity provider service, a token for authentication of the user;

encrypting the token based on a secret inputted by the user and first contextual data associated with at least one of: the user, the resource, or a source of the first request, wherein encrypting the token based on the secret inputted by the user and the first contextual data comprises:

encrypting the token using the secret to produce an intermediate output; and encrypting the intermediate output using the first contextual data to produce the encrypted token;

identifying, by the computing device, and during a second time later than the first time, a second request by the user to access the resource;

receiving the secret inputted by the user;

decrypting the encrypted token based on the user input and second contextual data associated with the second request wherein:

the second contextual data is associated with at least one of: the user, the resource, or a source of the second request, and the decrypting is failed based on a mismatch between the first contextual data and the second contextual data; and based on validating the decrypted token with the identity provider service, determining whether the user is permitted to access the resource.

* * * * *